United States Patent [19]
Bon et al.

[11] 3,884,839
[45] May 20, 1975

[54] NEUTRON ATTENUATING CONSTRUCTION MATERIAL

[75] Inventors: Charles K. Bon; Robert J. Moolenaar, both of Midland, Mich.

[73] Assignee: The Dow Chemical Company, Midland, Mich.

[22] Filed: Apr. 16, 1971

[21] Appl. No.: 134,887

[52] U.S. Cl. ......... 252/478; 250/108 WS; 176/86 R; 176/DIG. 2; 109/49.5
[51] Int. Cl. ..................... C04b 41/24; G21f C04
[58] Field of Search ........ 117/123 A, 123 B, 169 R, 117/169 A, 119.2; 250/108 R, 108 WS

[56] References Cited
UNITED STATES PATENTS

| | | | |
|---|---|---|---|
| 2,796,529 | 6/1957 | Morrison | 117/169 R |
| 3,002,857 | 10/1961 | Stalego | 117/123 B |
| 3,049,447 | 8/1962 | Knapp | 117/169 R |
| 3,453,160 | 7/1969 | Darling et al. | 250/108 WS |
| 3,511,692 | 5/1970 | Pratt et al. | 117/123 A |
| 3,649,342 | 3/1972 | Bartlett | 117/169 R |

Primary Examiner—William D. Martin
Assistant Examiner—William H. Schmidt
Attorney, Agent, or Firm—Robert W. Selby; Lloyd S. Jowanovitz

[57] ABSTRACT

A structural body to absorb neutrons and a method of producing the body. Such method involves impregnating a porous ceramic body with selected hydrogen and/or boron containing compounds substantially chemically inert to the body.

3 Claims, No Drawings

3,884,839

NEUTRON ATTENUATING CONSTRUCTION MATERIAL

BACKGROUND OF THE INVENTION

This invention relates to construction materials and more specifically to a building construction material which attenuates and/or absorbs neutrons.

It is known that porous bodies, such as concrete block, can be beneficially used in the construction industry for structural elements. Additionally, it has previously been ascertained that boron and its compounds absorb neutrons and that hydrogen attenuates the flow of neutrons. Heretofore, boron and/or hydrogen compounds have been added to mixes for products prior to forming and curing or sintering at elevated temperatures. Generally, the temperature necessary to cure or sinter the formed mix was in excess of the vaporization temperature of the hydrogen containing compounds in the mix. Consequently, much of the neutron attenuation value of the product was lost during the heat treating or curing cycle.

A light weight, fire resistant body having a strength adequate for building purposes and a high neutron absorption to body weight ratio is desired.

It is an object of this invention to provide a ceramic material which absorbs neutrons.

Another object of this invention is to provide a light weight, fire resistant, neutron absorbing ceramic body suitable for building construction.

It is a further object of this invention to provide a method to produce a light weight construction material to absorb a neutron flow.

Other objects and advantages of this invention will become apparent during the course of the following discussion.

SUMMARY OF THE INVENTION

The above objects and advantages have been realized in a method comprising contacting a ceramic body, having interconnecting pores throughout, with a curable liquid inorganic neutron absorber. The neutron absorber can be compounds containing hydrogen, which melt at temperatures in excess of about 50°C., and/or boron. Furthermore, the neutron absorber must be substantially chemically inert to the body and, in particular, to the binder and reaction products formed between the binder and clay in the body. Additionally, the compound should be effective in maintaining the structural strength of the body. Contact between the porous body and the neutron absorber should be for a sufficient time to impregnate at least some of the pores with the neutron absorber. The compound so impregnated is then cured to form a coherent impregnated body, containing the inorganic neutron absorber, suitable for absorbing the flow of neutrons. The term "absorb," as herein used in relation to neutrons, refers to neutron absorption and/or attenuation. "Ceramic" refers to substantially nonmetallic mineral containing inorganic bodies bonded by heating or by a curable binder. A body produced by the hereinbefore described method is suitable for building construction. The body, which absorbs neutrons, comprises a porous ceramic body impregnated with at least one inorganic neutron absorber selected from the group consisting of compounds containing hydrogen, for example hydrated sodium silicate and alum having a melting temperature of from about 50°C. to about 400°C., boric acid ($H_3BO_3$) and, preferably, hydrated ammonium and alkali metal borates. The described impregnated porous body is characterized by a light weight and high absorption of neutron flow to weight ratio.

DESCRIPTION OF THE PREFERRED EMBODIMENTS

The claimed porous ceramic body is preferably composed of an expanded clay aggregate such as kaolin, montmorillonite, attapulgite, bentonite, illite and perlite. The preferred body is more easily mechanically drilled and cut and, furthermore, is generally more economical than other ceramic bodies. The expanded clay aggregate can be fused or sintered together into a porous body; however, it is preferred that a binder such as a sodium silicate-clay fines-water solution be employed to adhere the aggregate together. In a preferred embodiment, the porous body, such a shaped structural building block, is substantially water-insoluble, has a density of from about 25 to about 100 pounds per cubic foot, a tensile strength of from about 90 to about 400 pounds per square inch, and a compressive strength of from about 100 to about 1,500 pounds per square inch. It is believed that these properties are especially suitable for structural construction elements.

The inert neutron absorber impregnant must be carefully chosen so that it does not chemically combine with the aggregate, binder, or a reaction product believed to be formed between the clay and sodium silicate. Such undesired combination is believed to reduce the structural strength of the porous body to limit its useful application as a construction material. Additionally, the impregnant has improved pore penetration when it wets the substrate body. Further desired impregnant characteristics are fire resistance and a melting temperature in excess of the impregnated porous block operating temperature and below about 400°C. For ease of handling, at room temperature, the minimum melting temperature is preferably about 50°C. and more preferably about 75°C. The impregnating compound is curable, by for example, cooling to below the freezing temperature, to a stable complex at ambient conditions without a significant loss of hydrogen. It has been found that the hereinbefore described alum and hydrated sodium silicate having a $Na_2O:SiO_2$ ratio of, for example, 1:2 and $NH_4Al\text{-}(SO_4)_2 \cdot 12H_2O$ are suitable impregnating compounds to form a body having satisfactory neutron absorption characteristics. Also impregnating with a boron containing compound such as boric acid and/or preferably hydrated ammonium or alkali metal borates produces a porous body having satisfactory strength for construction purposes and also the ability to absorb neutrons.

For adequate structural strength and highly satisfactory neutron absorbing characteristics, the impregnated porous body contains about 10 to about 50 weight percent of the neutron absorber impregnant. For optimum neutron absorption properties, the porous body is substantially completely impregnated with the aforementioned neutron absorber.

The porous body can be contacted with a curable liquid neutron absorber impregnant by for example, immersing the porous body in a liquid or molten impregnant bath and maintaining the porous body therein for a sufficient time for the impregnant to enter pores of the body. The body has interconnecting voids of a size adequate to afford flowing of the impregnant into the pores. To inhibit reverse flowing of the impregnant from the porous body upon removal of the body from the bath, the impregnated body can be rapidly cooled following impregnation. To further minimize loss of the impregnate from the porous body, the bath can be lowered in temperature to about the freezing point of the impregnate prior to removal of the porous body therefrom. After the compound has impregnated the porous body, the impregnated body is cured by cooling to below the freezing temperature of the impregnant.

The so impregnated body can be used as a construction material such as blocks or panels for walls, floors, roofs and supports where it is desired to have adequate structural strength and the added characteristic of neutron absorption. The body is useful in preventing the flow of neutrons from an area of high to low neutron concentration.

To further demonstrate the claimed invention, a porous block of expanded clay aggregate was bonded using an aqueous sodium silicate-kaolin mixture, formed, and dried and baked in an oven at 350°C for ½ hour to produce a porous body capable of being used for building construction purposes. The block was impregnated by immersing it into liquid $NH_4Al(SO_4)_2 \cdot 12H_2O$ maintained at a temperature in excess of 93°C, the melting point of $NH_4Al(SO_4)_2 \cdot 12H_2O$. Upon removal of the block from the liquid impregnant, the impregnant within the body cooled and solidified. It was found that 60 grams of impregnant remain in the 2 inches × 2 inches × 2 inches block.

Another porous block was prepared as above and impregnated by immersing it into a boiling mixture of a 44 percent solution of sodium silicate into which an equal weight of $Na_2B_4O_7 \cdot 10H_2O$ had been dissolved. Upon removal of the impregnated porous block from the mixture and curing by cooling to below the mixture's freezing temperature, it was found that 41 grams of impregnant had been retained in the body.

The impregnated body was found to be suited for construction purposes and the absorption of neutrons. The impregnated porous body was also found to have a high ratio of neutron absorption to impregnated body weight in comparison to non-impregnated construction materials.

What is claimed is:

1. A body suitable for building construction comprising an expanded clay porous body impregnated with at least from about 10 to about 50 weight percent of at least one inorganic neutron absorber selected from the group consisting of an alum having a melting temperature within the range of about 50°C to about 400°C, boric acid, hydrated ammonium and alkali metal borates, and hydrated sodium silicate, said impregnated body characterized by light weight and absorption of neutron flow.

2. The body of claim 1 wherein the neutron absorber is selected from the group consisting of boric acid and hydrated ammonium and alkali metal borates.

3. The body of claim 1 wherein the porous body is substantially completely impregnated with the neutron absorber.

* * * * *